United States Patent [19]
Wilmer

[11] Patent Number: 5,389,850
[45] Date of Patent: Feb. 14, 1995

[54] ROTATIONAL SHOCK SENSOR

[75] Inventor: Richard K. Wilmer, San Jose, Calif.

[73] Assignee: Maxtor Corporation, San Jose, Calif.

[21] Appl. No.: 191,988

[22] Filed: Feb. 4, 1994

[51] Int. Cl.6 ............................................. H01L 41/08
[52] U.S. Cl. .................... 310/329; 310/339; 310/359
[58] Field of Search ............... 310/329, 330, 359, 338, 310/339

[56] References Cited

U.S. PATENT DOCUMENTS

| | | | |
|---|---|---|---|
| 2,963,911 | 12/1960 | Courtney-Pratt et al. | 310/338 |
| 3,142,991 | 8/1964 | Pittman | 73/504 |
| 3,558,936 | 1/1971 | Horan | 310/338 |
| 3,561,832 | 2/1971 | Karrer et al. | 310/320 |
| 3,646,536 | 2/1972 | Bleiman | 340/174.1 C |
| 3,702,997 | 11/1972 | Jamieson | 340/174.1 E |
| 3,786,457 | 1/1974 | Kahn | 340/174.1 C |
| 3,984,873 | 10/1976 | Pejcha | 360/105 |
| 4,197,737 | 4/1980 | Pittman | 310/330 |
| 4,211,951 | 7/1980 | Jensen | 310/329 |
| 4,280,156 | 3/1979 | Villette | 360/105 |
| 4,315,289 | 2/1982 | Holecek et al. | 360/99 |
| 4,345,473 | 8/1982 | Berni | 310/329 |
| 4,535,374 | 8/1985 | Anderson et al. | 360/103 |
| 4,686,592 | 8/1987 | Carroll et al. | 360/97 |
| 4,718,276 | 1/1988 | Laughlin | 73/516 LM |
| 4,754,646 | 7/1988 | EerNisse et al. | 310/338 |
| 4,862,298 | 8/1989 | Genheimer et al. | 360/60 |
| 4,933,785 | 6/1990 | Morehouse et al. | 360/78.04 |
| 5,025,336 | 6/1991 | Morehouse et al. | 360/971.02 |
| 5,027,241 | 6/1925 | Hatch et al. | 360/105 |
| 5,049,776 | 9/1991 | Ogawa | 310/339 |
| 5,067,351 | 11/1991 | Laughlin | 73/516 LM |
| 5,170,104 | 12/1992 | Laughlin | 318/135 |
| 5,176,030 | 1/1993 | Laughlin | 73/505 |
| 5,189,575 | 2/1923 | Onooka et al. | 360/105 |
| 5,272,922 | 12/1993 | Watson | 73/505 |

FOREIGN PATENT DOCUMENTS

PCT/US91/-
09367 12/1991 WIPO ............ G11B 5/54

OTHER PUBLICATIONS

"Retracting Reciprocating Magnetic Stripe Read Head Drive", R. A. Hampson and J. V. Vetrone, *IBM Technical Disclosure Bulletin* vol. 25, No. 4, pp. 1827–1828, Sep. 1981.

Primary Examiner—Thomas M. Dougherty
Attorney, Agent, or Firm—Blakely, Sokoloff, Taylor & Zafman

[57] ABSTRACT

A sensor for sensing rotational displacements of a body comprises an elongated beam of a material providing a piezoelectric effect. The elongated beam has a first and second ends and a central portion, with the ends of the beam being attached to an interior surface of a case. The case, in turn, is attached to the body. When the body is subject to rotational accelerations, the beam is stressed, and a piezoelectric voltage is generated across the length of the beam.

20 Claims, 5 Drawing Sheets

FIG_1A
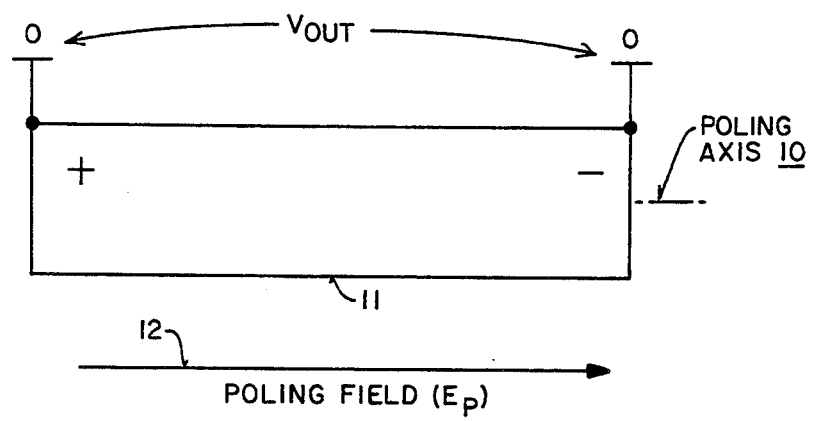
FIG_1B
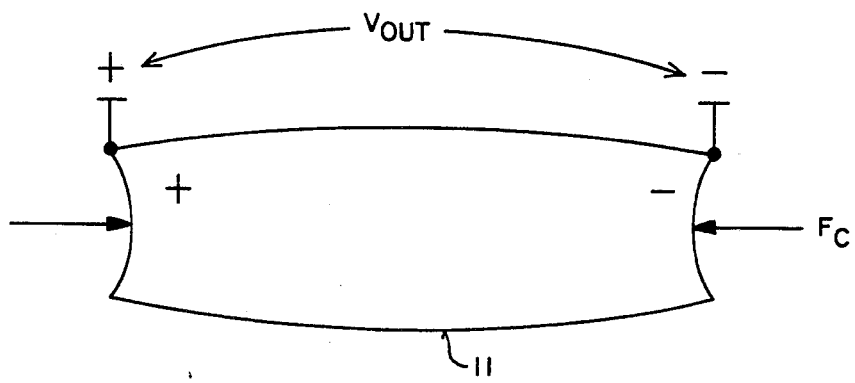
FIG_1C
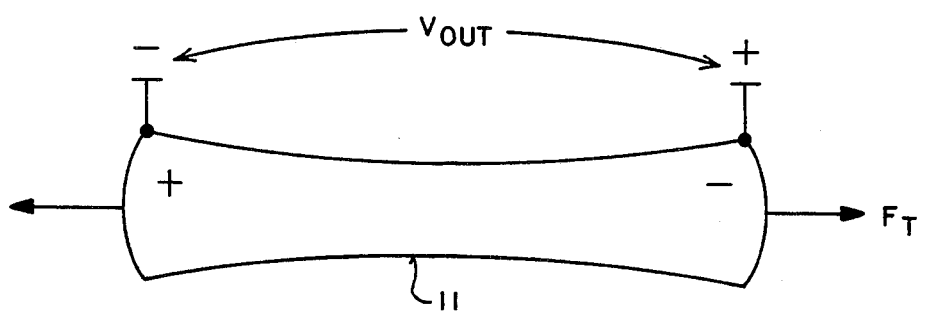

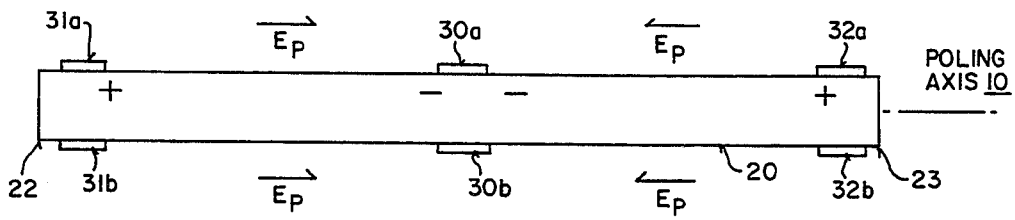
FIG_2A
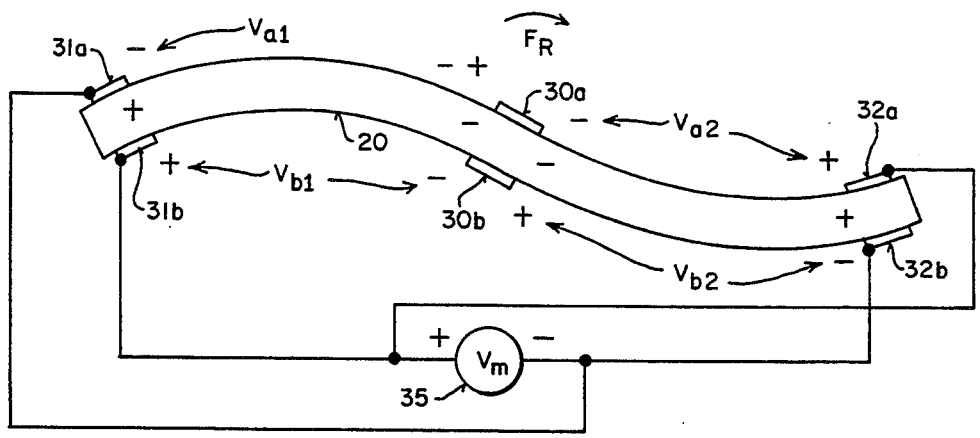
FIG_2B
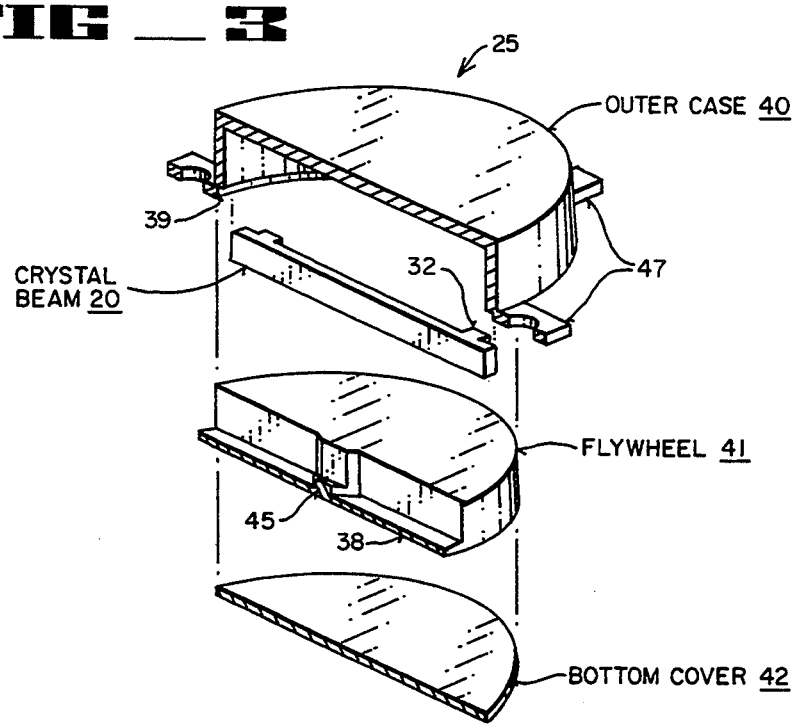
FIG_3

FIG_4
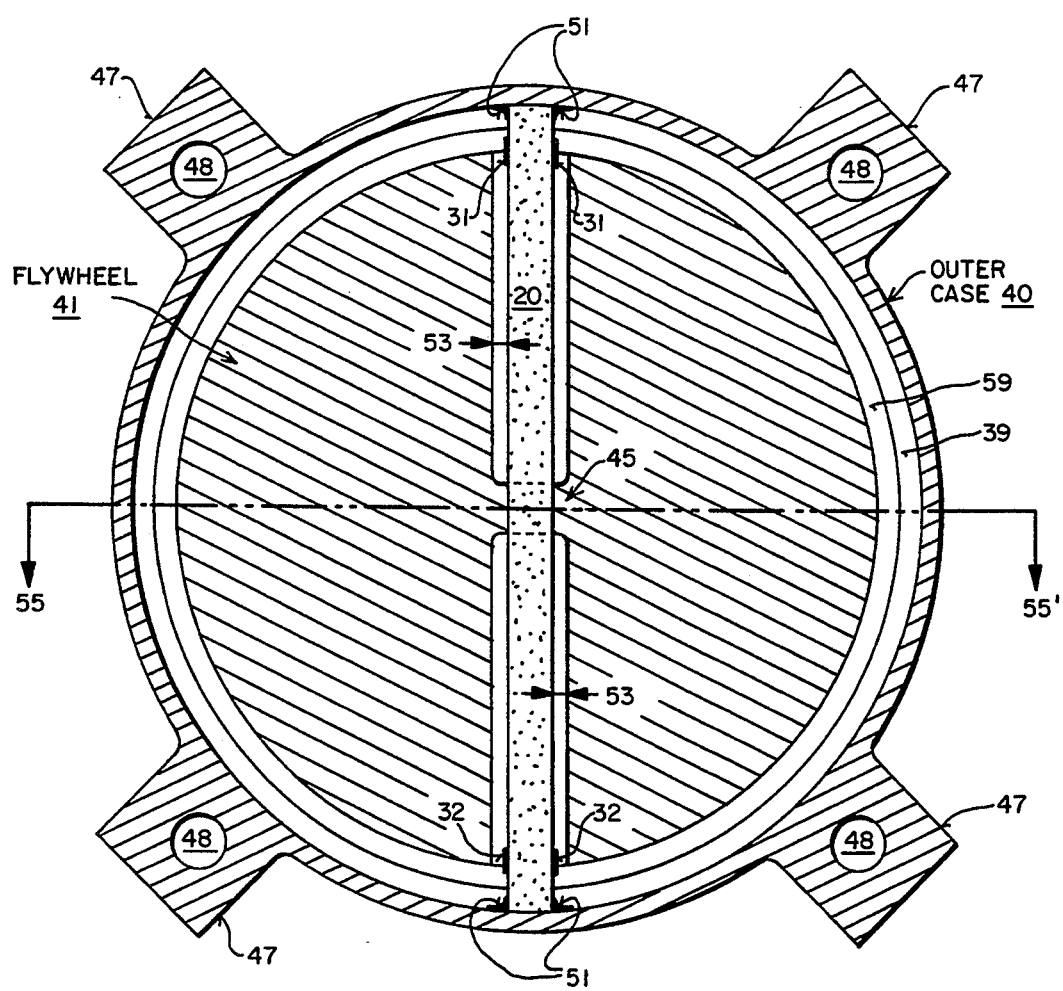

FIG_5
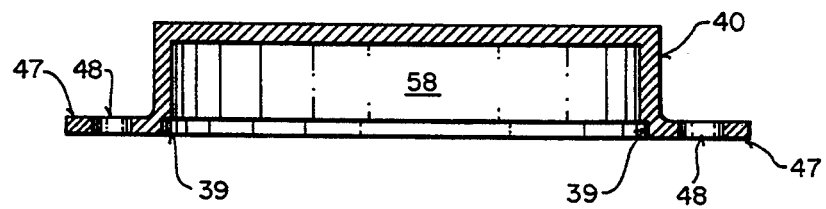
FIG_6
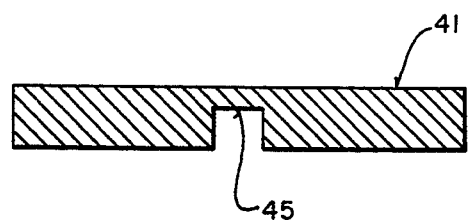
FIG_7
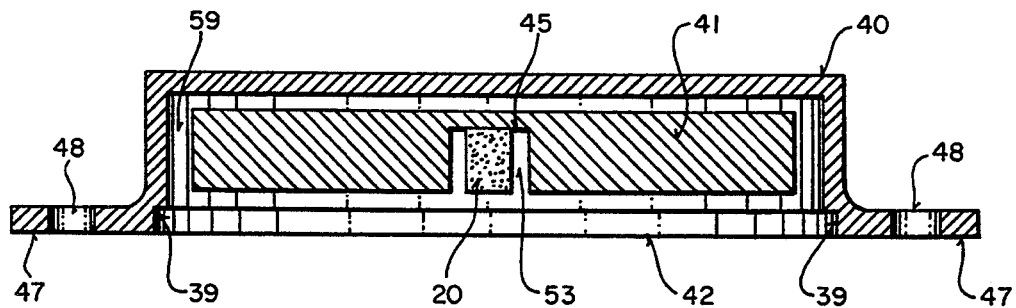

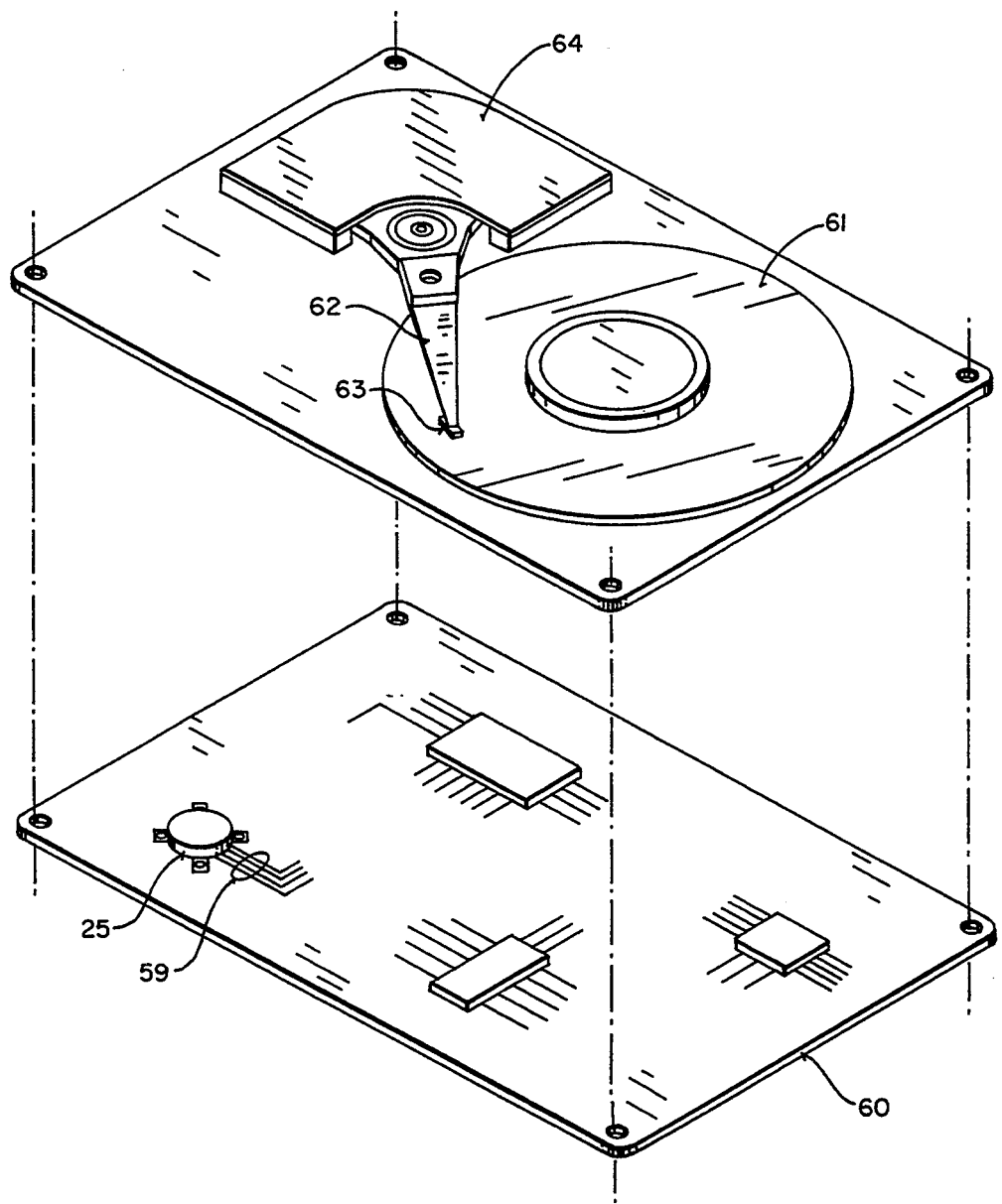
FIG_8

ROTATIONAL SHOCK SENSOR

FIELD OF THE INVENTION

The invention relates generally to the field of motion sensors; more specifically, to apparatus for sensing rotational displacements in mobile computing devices, including portable data storage devices.

BACKGROUND OF THE INVENTION

With the advent of portable computing there has arisen of need for a motion sensors capable of detecting extreme or sudden accelerations. By way of example, rigid disk drive units housed within a portable computer are extremely sensitive to certain types of displacements. If data is being written to the disk surface by a transducer, and the drive or computer is subject to physical shock (as maybe the case if the device was suddenly dropped) the resulting motion could case the transducer to be knocked off the data track that is currently being written. Obviously, off-track writing would produce highly undesirable data errors.

In a disk drive unit, an actuator arm is employed to position one or more transducers over a concentric data track of the magnetic medium. Because of their configurations, these actuator assemblies are generally immune to sudden linear accelerations or shock displacements. They are, however, very sensitive to rotational displacements. For example, a rotational acceleration component in the plane of the magnetic disk about the actuator center line essentially causes the disk to be rotated out from the underneath the transducer. If the acceleration is high enough and the drive is writing data to the disk there is a chance that data can be written over adjacent tracks.

In the prior art, a variety of sensors for detecting angular motion have been devised. For example, U.S. Pat. Nos. 4,718,276; 5,067,351; 5,176,030; and 5,170,104 generally describe various types of sensors and control systems for sensing sudden displacements. These sensors, however, are highly complex and, in some cases, require the use of dangerously toxic materials such as mercury.

The prior art also describes numerous other sensor designs. For example, U.S. Pat. Nos. 5,025,336; 4,862,298; 4,933,785; 5,189,575; 4,535,374; 3,984,873; 5,027,241; 3,646,536; 4,686,592; 4,315,289; 4,280,156; 3,786,457; 3,702,997; PCT International Application No. PCT/US91/09367, and IBM Technical Disclosure Bulletin Vol. 25, No. 4, September 1982, show a variety of systems which include sensors sensitive to both linear and rotational accelerations. What is needed, however, is a shock sensor that provides sensing of rotational displacements, while being immune or largely insensitive to linear accelerations in an X or Y direction. Additionally, the sensor should be relatively simple and inexpensive to manufacture and avoid the use of toxic substances.

SUMMARY OF THE INVENTION

The present invention overcomes the drawbacks of the prior art by providing a sensor for sensing rotational displacements of a body. In one implementation, the present invention comprises an elongated beam of a material which provides a piezoelectric effect. The elongated beam has a first and second ends and a central portion. The respective ends of the elongated beam are attached to an interior surface of a case. The case, in turn, is attached to the body; it is the body that is subject to rotational displacements.

Within the enclosure formed by the case, a flywheel is attached to the central portion of the beam. Due to its own inertia the flywheel has a tendency to remain stationary whenever the body is subject to rotational accelerations. But because the flywheel is attached to the elongated beam, rotational accelerations of the body cause the beam to become stressed. Due to the piezoelectric nature of the elongated beam, these stresses generate a voltage across the length of the beam. When employed in a disk drive unit, this voltage may be utilized, by way of example, to turn off or disable the electrical signals coupled to the transducers for writing data to the magnetic medium.

BRIEF DESCRIPTION OF THE DRAWINGS

The present invention is illustrated by way of example, and not by way of limitation, in the figures of the accompanying drawings, wherein:

FIGS. 1A–1C illustrate piezoelectric voltages resulting from various forces applied to a ceramic or crystal element.

FIG. 2A illustrates the piezoelectric beam utilized in conjunction with the present invention.

FIG. 2B illustrates the beam of FIG. 2A when the sensor of the present invention is subjected to a rotational displacement.

FIG. 3 is an exploded view of one embodiment of the present invention.

FIG. 4 is a bottom view of the sensor shown in FIG. 3, with the bottom cover removed.

FIG. 5 illustrates a cross-sectional side view of the outer case shown in the embodiment of FIG. 3.

FIG. 6 is a cross-sectional side view of the flywheel illustrated in the embodiment of FIG. 3.

FIG. 7 is a cross-sectional side view of the sensor illustrated in the embodiment of FIG. 3.

FIG. 8 illustrates a disk drive unit incorporating a shock sensor.

DETAILED DESCRIPTION

An apparatus for sensing rotational accelerations is disclosed. In the following description, numerous specific detail are set forth such as material types, dimensions, voltages, etc., in order to provide a thorough understanding of the invention. It will be obvious, however, to one skilled in the art that these specific details need not be used to practice the present invention. In other instances, well known circuits and apparatus have not been set forth in detail in order to avoid unnecessarily obscuring the present invention.

Overview of the Present Invention

Piezoelectricity is a property of certain classes of crystalline materials. Piezoelectric properties occur naturally in certain crystalline materials and can be induced in other polycrystalline ceramics. When mechanical pressure is applied to one of these materials the crystalline structure produces a voltage proportional to the applied force.

Piezoelectric ceramics provide more versatility than natural piezoelectric crystals because their physical, chemical and piezoelectric characteristics can be tailored to specific applications. For example, the mechanical and electrical axis of piezoelectric ceramic materials can be precisely oriented in relation to the shape of the ceramic. The process that induces piezoelectric properties in these ceramics is known as "poling".

FIG. 1A illustrates a piezoelectric ceramic element 11 which has been "poled" along a poling axis 10. In FIG. 1A, ceramic element 11 is shown oriented with a D.C. poling field ($E_P$) 12 from left to right. Poling field 12 determines the orientation of the mechanical and electrical axis. Note that in FIG. 1A, the ceramic element is at rest (not subject to external mechanical stresses) so that no voltage appears across the length of element 11.

FIGS. 1B and 1C illustrate the generation of piezoelectric voltages from respective compressive and tensile forces applied to ceramic element 11. In FIG. 1B, a compressive force $F_c$ is applied across the length of ceramic element 11. A voltage with the same polarity as the poling voltage results from this compressive force applied parallel to the poling axis. In FIG. 1C, a tensile force $F_T$ is also applied parallel to the poling axis of element 11, resulting in a voltage with the opposite polarity across the length of the ceramic material.

Note that in FIGS. 1B and 1C the deformation of ceramic element 11 is exaggerated for illustration purposes. It is appreciated that the maximum dimensional change of a stressed ceramic element is relatively small—on the order of a few microinches. Similarly, the magnitude of the piezoelectric forces, actions and voltages are also relatively small. As will be discussed in more detail shortly, the present invention utilizes a piezoelectric material to produce an output voltage in response to rotational accelerations. This output voltage then is amplified by an electronic circuit, with the signal being used in one embodiment to disable the data writing process in a disk drive unit.

Discussion of an Embodiment of the Invention

With reference to FIG. 2A, there is shown a side view of the piezoelectric element utilized in the present invention to generate a voltage in response to a rotational acceleration. The piezoelectric material of FIG. 2A comprises an elongated crystal or ceramic beam 20 having ends 22 and 23. Contacts 31a and 31b are attached on opposite sides of beam 20 near end 22, while contacts 32a and 32b are attached along opposite side of beam 20 near end 23. Disposed on opposite sides of the central region of beam 20 are a third set of contacts 30a and 30b. Collectively, contacts 30-32 are utilized to apply voltages as part of the poling process. Contacts 31 and 32 also function as voltage output terminals during motion sensing, as will be described shortly.

In accordance with the present invention, beam 20 is poled by applying a very high D.C. voltage (e.g., 10 kV) between terminals 31 and 30, and also terminals 32 and 30. The poling process establishes the piezoelectric effect in beam 20. The poling fields, $E_P$, are illustrated in FIG. 2A as being in a direction from the respective ends 22 and 23 toward the center of beam 20. In other words, a first poling field is produced by applying a very high voltage between terminals 31 and 30. A second poling field is established in the opposite direction in the other half of the bar by applying a high voltage between terminals 32 and 30. By poling beam 20 from the ends to the center in opposite directions, two separate poling fields having opposite polarities are established in each half of the crystal. The importance of this poling pattern will become evident shortly.

Now consider the case illustrated in FIG. 2B. FIG. 2B illustrates the response of poled beam 20 (poled as described in conjunction with FIG. 2A) when subject to a rotational stress. The rotational stress is experienced as a rotational force, $F_r$, applied to the center of the beam in a clockwise direction. This torque causes piezoelectric voltages to be generated between each of the various terminals 30-32, as shown by voltages $V_{a1}$, $V_{a2}$, $V_{b1}$, $V_{b2}$.

Note that in FIG. 2B, opposite sides of each half of beam 20 experience tensile and compressive forces in opposite directions. This is referred to as the "S-effect", where the beam is stressed such that it is deformed into an S-shape. Because of the way that beam 20 has been poled, these forces generate voltages which add in series across the length of beam 20 between ends 22 and 23.

For example, FIG. 2B illustrates voltage $V_{a1}$ having a polarity opposite to the polarity of the poling field being generated between terminals 31a and 30a. The direction of voltage $V_{a1}$ is consistent with the application of a tensile force to this portion of beam 20. Likewise, voltage $V_{b2}$ is shown being generated between terminals 32b and 30b in a direction opposite to that of the poling field, because of the tensile force experienced in this portion of beam 20.

Due to the compressive force experienced in the portion of the beam between terminals 31b and 30b, voltage $V_{b1}$ is generated with a polarity that is in the same direction as that of the poling field in this half of beam 20. The same is true of voltage $V_{a2}$ which is generated between terminals 32a and 30a.

The net effect is that voltages $V_{a1}$ and $V_{a2}$ add in one direction on the one side of beam 20 in FIG. 2B, while voltage $V_{b1}$ and $V_{b2}$ add in the opposite direction on the other side of the beam. Utilizing contacts 31 and 32 as terminals, FIG. 2B illustrates how appropriate connections may be made to a voltage sensing device, such as voltmeter 35, to measure or simply detect the output piezoelectric voltage generated by beam 20.

In a current embodiment, the output voltage produced by beam 20 ranges from several hundred millivolts up to a volt for stresses on the order of 10,000 psi. Also for a current embodiment, beam 20 has a cross-sectional area of approximately 20×30 mils, with a length of about 0.34 inches. Beam 20 preferably comprises a piezoelectric ceramic material manufactured by Morgan Matroc, Inc. Several different types of piezoelectric ceramic materials may be utilized, such as Morgan Matroc, Inc. PZT-5A or PZT-5J. It is appreciated that other ceramic materials or crystals may also be utilized in the present invention. The only essential requirements are that the piezoelectric element be poled in the manner described in conjunction with FIG. 2A, and that it provide a piezoelectric output voltage which is detectable given the magnitude of the stresses that the sensor normally experiences.

In the current embodiment, contacts 30-32 comprise electroless nickel contacts. Gold may also be used for greater compatibility with tab automated bonding technologies. Each of the pads illustrated in FIG. 2B is approximately 15×30 mils across.

FIG. 3 illustrates an exploded cross-sectional perspective view of shock sensor 25 including elongated ceramic beam 20. Shown attached to beam 20 are electrode pads 31 and 32 (the central contact pad 30 is not shown in FIG. 3). In sensor 25, beam 20 is mounted within the enclosure or cavity provided by outer case 40. As discussed earlier, ends 22 and 23 of beam 20 are attached to the interior surface of the enclosure formed by outer case 40. For example, ordinary epoxy glue may be utilized to secure the ends of beam 20 to the inside surface of outer case 40.

The central region of crystal beam 20 is attached to the raised portion 45 of flywheel 41. In FIG. 3, each half of flywheel 41 is illustrated being connected by plate 38. When fully assembled, flywheel 41 only contacts portion 45 of the central region of beam 20, and nothing else. In other words, a clearance space is formed between flywheel 41 and the interior surface of case 40.

At the completion of the manufacturing process, a bottom cover 42 is secured to flange 39 of the case 40. Again, ordinary epoxy glue may be utilized to secure bottom cover 42 to outer case 40. Once bottom cover 42 has been attached to case 40, sensor 25 may be mounted to a flat surface using tabs 47, which are shown to include an orifice for accommodating an attachment means such as a screw or rivet.

The way that sensor 25 works is that when a moment is applied to the sensor—that is, when the body to which sensor 25 is attached is subjected to rotational acceleration—flywheel 41 tends to remain stationary because of its inertia. However, because flywheel 41 is only attached to the center of beam 20 (via raised attachment portion 45), and because beam 20 is also attached to the interior surface of case 40 at its ends, flywheel 41 torques beam 20 into an S-shape, as shown previously in FIG. 2. It is important to understand that flywheel 41 is totally free to move since it is only attached to beam 20 at the center of beam 20 via region 45. In essence, flywheel 41 is suspended within the enclosure formed by case 40 and bottom cover 42. This is best seen by the illustrations of FIGS. 4–7.

FIG. 5 is a cross-sectional side view of outer case 40. The interior space formed by the casing is shown in FIG. 5 by region 58, As before, tabs 47 are shown having an orifice 48 to accommodate various attachment methods.

FIG. 6 is a cross-sectional side view of flywheel 41 through cut lines 55 and 55' (see FIG. 4). FIG. 6 clearly shows the raised attachment region 45.

FIG. 7 illustrates the assembled sensor 25 as shown through the cross-sectional side view of cut lines 55 and 55'. As described above, flywheel 41 is shown being suspended from beam 20 via attachment region 45. Note that a clearance space 53 is formed between the outer sides of beam 20 and the interior sides surfaces of flywheel 41. FIG. 7 also illustrates the clearance space 59 formed between the outer surface of flywheel 41 and the interior surface of the enclosure formed by case 40 and cover 42. In the present embodiment, clearance space 59 is on the order of 1 to 5 mils wide.

Referring back to FIG. 4, a bottom view of sensor 25 with bottom cover 42 removed is shown. FIG. 4 clearly illustrates the circular shape of flywheel 41 as it is suspended over elongated piezoelectric beam 20. The attachment area for flywheel 41 to beam 20 is shown as rectangular region 45. In a current embodiment, this attachment area is approximately 15×30 mils. Outer case 40 comprises injection-molded plastic with the ends of beam 20 being bonded to the interior surface of case 40 using an ordinary glue 51, such as epoxy.

Not shown in FIGS. 4–7 are the various wires which are bonded to pads 31 and 32 and which extend out of the enclosure. Normally, sensor 25 includes an opening in either cover 42 or case 40 to accommodate the sensor wires. By way of example, these wires would typically be soldered to the printed circuit board on which sensor 25 is mounted. As explained earlier, these wires couple the piezoelectric voltage of beam 20 to an appropriate voltage sensing device or circuit.

FIG. 8 illustrates the shock sensor of the present invention finding application in conjunction with a disk drive unit. As shown, sensor 25 is mounted on a printed circuit board 60 with wires 59 being shown connected to appropriate circuitry to detect the piezoelectric voltage generated as a result of rotational displacement of the drive unit. By way of example, wires 59 may be coupled to a charge amplifier and then to a voltmeter or similar sensor, such as a comparator or operational amplifier. When the output of sensor 25 exceeds a certain threshold level (i.e., a minimum detectable level) the resulting signal may be used to disable or turn-off the electronic circuitry on board 60 utilized in conjunction with the transfer of data to magnetic disk 61. By way of example, the stiffness or first resonant frequency of flywheel 41 against beam 20 in a current embodiment is greater than 20 KHz. This provides the necessary response time needed to turn-off the write gate circuitry on board 60 under typical high shock conditions.

It is important to realize that in order to provide the sensing of rotational accelerations in a disk drive unit, sensor 25 should be mounted in a plane which is either the same as, or substantially parallel to, the plane in which disk 61 resides. As shown in FIG. 8, disk 61, actuator assembly 64, transducer or head 63 and actuator arm 62 all lie in a first general plane. When assembled, printed circuit board 60 lies in a second plane substantially parallel to the plane formed by disk 61. Thus, mounting sensor 25 on board 60 accomplishes the goal of sensing rotational accelerations of the drive unit so as to protect the drive from writing data off-track during shock conditions.

Practitioners in the art will appreciate that the sensor 25 may be mounted either on the top or bottom of board 60, or alternatively anywhere within the housing of the disk drive assembly, as long as beam 20 lies in the same general plane, or substantially parallel to, the plane in which disk 61 resides. Likewise, practitioners will understand that the sensor of the present invention may be built in a variety of different embodiments. For example, flywheel 41 may be a multitude of different shapes—its primary function being to stress the crystal or ceramic beam in order to generate a piezoelectric voltage under rotational acceleration conditions.

Similarly, a variety of materials may be used for each of the elements of sensor 25. Currently flywheel 41 is cast from a low temperature eutectic metal such as solder or lead; however, an assortment of other materials may also be used. In most situations, it is desirable that flywheel 41 have a high mass in order to apply maximum torque to beam 20 under shock conditions.

Whereas many alternations and modifications to the present invention will no doubt become apparent to the person of ordinary in the art after having read the foregoing description, it is to be understood that the particular embodiment shown and described by way of illustration are in no way intended to be limiting. Therefore, reference to the details of the illustrated figures is not intended to limit the scope of the claims which themselves recite only those features regarded as essential to the invention.

What is claimed:

1. A sensor for sensing rotational displacement of a body comprising:

an elongated beam of a material providing a piezoelectric effect, said beam having a pair of ends and a central portion;

a case attached to said body, said case having an interior surface, said beam being fixedly attached to said interior surface at said ends;

a flywheel attached to said beam, rotational displacement of said body causing said flywheel to stress said crystal so as to generate a voltage across said beam due to said piezoelectric effect.

2. The sensor of claim 1 further comprising means coupled to said beam for detecting said voltage.

3. The sensor of claim 2 wherein said detecting means further comprises means for amplifying said voltage.

4. The sensor of claim 1 wherein said sensor generates said voltage in response to rotational accelerations, but is insensitive to linear accelerations of said body.

5. The sensor of claim 4 wherein said flywheel is fixedly attached to said beam at said central portion.

6. The sensor of claim 5 wherein said beam further comprises a pair of electrodes attached at each end of said beam, said electrode providing electrical contact to said beam, with said voltage appearing across said electrodes.

7. The sensor of claim 1 wherein said flywheel is circular in shape.

8. The sensor of claim 6 wherein said material comprises a piezoelectric ceramic.

9. The sensor of claim 8 wherein said case comprises plastic.

10. The sensor of claims 1,2, 3, 4, 5, 6, 7, 8 or 9 wherein said flywheel is enclosed within said case, a clearance space existing between said flywheel and said interior surface of said case.

11. The rotational shock sensor for sensing rotational accelerations in a disk drive unit employing a rotating disk for data storage, said sensor comprising:

a case attached to said disk drive unit, said case forming an enclosure;

an elongated beam comprising a piezoelectric material, said beam having first and second ends, and a center region, disposed along a primary axis, said first and second ends being bonded to said case within said enclosure, said beam having at least one electrode at each of said first and second ends;

a flywheel attached to said center region of said beam, said flywheel and said beam being housed within said enclosure with a space being formed between said flywheel and said case, said flywheel imparting a moment to said beam in response to a rotational acceleration of said disk drive unit, said moment generating a voltage across said electrodes.

12. The sensor of claim 11 further comprising means attached to said electrodes for detecting said voltage.

13. The sensor of claim 12 wherein said disk drive unit includes a circuit for writing data to said disk, said circuit being disposed on a printed circuit board, and wherein said detecting means further comprises means for disabling said writing means in response to said voltage.

14. The sensor of claim 11 wherein said beam includes first and second polling fields formed along said primary axis, said first polling field being formed between said first end and said center region, with said second polling field being formed between second end and said center region in a direction opposite to that said first polling field.

15. The sensor of claim 14 wherein said sensor generates said voltage in response to rotational accelerations, but is insensitive to linear accelerations of said disk drive unit.

16. The sensor of claim 15 wherein said flywheel is circular in shape.

17. The sensor of claim 16 wherein said material comprises a piezoelectric ceramic.

18. The sensor of claim 17 wherein said case comprises plastic.

19. The sensor of claims 11, 12, 13, 14, 15, 16, 17 or 18 wherein said disk rotates in a first general plane and said beam lies within a second general plane substantially parallel to said first general plane.

20. The sensor of claim 19 wherein said case comprises an outer housing and a cover.

* * * * *